United States Patent
Yahata et al.

(10) Patent No.: US 10,112,835 B2
(45) Date of Patent: Oct. 30, 2018

(54) METHOD FOR PURIFYING DIFLUOROPHOSPHATE

(71) Applicant: STELLA CHEMIFA CORPORATION, Osaka (JP)

(72) Inventors: Naoki Yahata, Osaka (JP); Tetsuo Nishida, Osaka (JP)

(73) Assignee: STELLA CHEMIFA CORPORATION, Osaka (JP)

(*) Notice: Subject to any disclaimer, the term of this patent is extended or adjusted under 35 U.S.C. 154(b) by 0 days.

(21) Appl. No.: 14/419,181

(22) PCT Filed: Jun. 6, 2014

(86) PCT No.: PCT/JP2014/065098
§ 371 (c)(1),
(2) Date: Feb. 2, 2015

(87) PCT Pub. No.: WO2014/196631
PCT Pub. Date: Dec. 11, 2014

(65) Prior Publication Data
US 2016/0075557 A1    Mar. 17, 2016

(30) Foreign Application Priority Data

Jun. 7, 2013 (JP) ................. 2013-121329

(51) Int. Cl.
*C01B 25/455* (2006.01)
*B01J 31/02* (2006.01)
*H01M 10/0567* (2010.01)
*H01M 10/0525* (2010.01)

(52) U.S. Cl.
CPC ......... *C01B 25/455* (2013.01); *B01J 31/0288* (2013.01); *C01P 2006/80* (2013.01); *H01M 10/0525* (2013.01); *H01M 10/0567* (2013.01); *H01M 2300/0025* (2013.01)

(58) Field of Classification Search
CPC ................................................. C01B 25/455
See application file for complete search history.

(56) References Cited

U.S. PATENT DOCUMENTS

| | | | | |
|---|---|---|---|---|
| 4,374,108 A * | 2/1983 | Nakaso | .................. | C01B 25/455 423/185 |
| 2008/0102376 A1* | 5/2008 | Kato | .................. | C01B 25/455 429/332 |
| 2011/0111288 A1* | 5/2011 | Nishida | .................. | C01B 25/455 429/199 |
| 2013/0115522 A1* | 5/2013 | Garcia-Juan | .......... | C01B 25/455 429/338 |
| 2014/0205916 A1* | 7/2014 | Garcia-Juan | .......... | C01B 25/455 429/403 |
| 2015/0263384 A1 | 9/2015 | Boll | | |

FOREIGN PATENT DOCUMENTS

| | | |
|---|---|---|
| DE | 813848 | 9/1951 |
| EP | 2 712 843 A1 | 4/2014 |
| JP | 3439085 | 6/2003 |
| JP | 2005-053727 A | 3/2005 |
| JP | 2005-219994 A | 8/2005 |
| JP | 2005-306619 A | 11/2005 |
| JP | 2006-143572 A | 6/2006 |
| JP | 2010-155773 A | 7/2010 |
| JP | 2010-155774 A | 7/2010 |
| JP | 2012-51752 A | 3/2012 |

OTHER PUBLICATIONS

Extended European Search Report dated Feb. 29, 2016, received in corresponding European Patent Application No. 14807282.0.
Lange, "Über die Difluorphosphorsäure und ihre der Perchlorsäure ähnliche Salzbildung," *Ber.Dtsch.Chem.*, Ges.B26, pp. 786-792 (1929).
Lange, Zh.Neorgan.Khim.,7, pp. 1313-1315 (1962).
Matsumoto et al., "A New Series of Ionic Liquids Based on the Difluorophosphate Anion," *Inorganic Chemistry*, vol. 48(15), pp. 7350-7358 (2009).
Matsumoto et al., "Properties of $PO_2F_2$-based ionic liquids as electrolytes for electric double layer capacitors," Proceedings of the 77th Electrochemical Society in Japan 1/18.
Schülke et al., Proceedings of 44th Japan Society for Analytical Chemistry, p. 536 (1994).
Thompson et al., "Preparation and infrared spectra of alkali metal difluorophosphates," *Inorg. Nucl. Chem. Letters*, vol. 5, pp. 581-585 (1969).
Vast et al., "Etude methodologique de la synthese des difluorodioxophosphates metalliques a partir de l'oxyde du difluorure de phosphoryle," *Journal of Fluorine Chemistry*, vol. 38, pp. 297-302 (1988).

\* cited by examiner

*Primary Examiner* — Ngoc-Yen Nguyen
(74) *Attorney, Agent, or Firm* — Knobbe Martens Olson & Bear LLP

(57) ABSTRACT

Provided is a method for purifying a difluorophosphate, in which a difluorophosphate is purified to a high purity. The method includes a method for purifying a difluorophosphate, comprising bringing hydrogen fluoride into contact with a difluorophosphate containing an impurity and subsequently heating and drying the difluorophosphate, or bringing the hydrogen fluoride into contact with the difluorophosphate containing the impurity while heating and drying the difluorophosphate containing the impurity, thereby removing the impurity.

17 Claims, No Drawings

METHOD FOR PURIFYING DIFLUOROPHOSPHATE

CROSS-REFERENCE TO RELATED APPLICATIONS

This application is the U.S. National Phase under 35 U.S.C. § 371 of International Application PCT/JP2014/065098, filed Jun. 6, 2014, which claims priority to JP 2013-121329, filed Jun. 7, 2013.

TECHNICAL FIELD

The present invention relates to a method for purifying a difluorophosphate very useful as, for example, an additive for a nonaqueous electrolytic solution for secondary batteries.

BACKGROUND ART

In recent years, investigations have been actively advanced for applying an ionic liquid as an electrolytic solution for batteries or electric double layer capacitors, and for using an ionic liquid as a plating bath. In conventional batteries or electric double layer capacitors, an aqueous electrolytic solution or an organic electrolytic solution has been used as an electrolytic solution. However, the aqueous electrolytic solution has the problem of being restricted about the decomposition voltage of water. The organic electrolytic solution has problems about heat resistance and safety. By contrast, an ionic liquid has characteristics preferable for safety, such as flame resistance and nonvolatility, and is also high in electrochemical stability. The ionic liquid is therefore suitable, in particular, for an electrolytic solution for batteries or electric double layer capacitors used in a high-temperature environment.

In order to use an ionic liquid as an electrolytic solution for batteries or electric double layer capacitors, investigations have been advanced about various types of ionic liquids each composed of a cation and an anion. For example, Non-Patent Document 1 reports properties of 1-ethyl-3-methylimidazolium difluorophosphate, which has a difluorophosphate as an anion, as an ionic liquid. Non-Patent Document 2 reports that the 1-ethyl-3-methylimidazolium difluorophosphate has electroconductivity and voltage resistance equivalent to those of 1-ethyl-3-methylimidazolium tetrafluoroborate, which is known as a typical ionic liquid, and can be suitably used for an electrolyte for electric double layer capacitors.

According to Non-Patent Document 1, in a method for producing the 1-ethyl-3-methylimidazolium difluorophosphate, the 1-ethyl-3-methylimidazolium difluorophosphate can be produced by reacting 1-ethyl-3-methylimidazolium chloride with potassium difluorophosphate in acetone, filtering off potassium chloride produced as a by-product from the solution in acetone, allowing the remaining solution to act onto an alumina column, and then distilling away acetone therefrom. Impurities in an electrolytic solution remarkably affect performances of batteries or electric double layer capacitors; thus, when an ionic liquid is used as an electrolytic solution, it is preferred to reduce impurities as much as possible. The ionic liquid is hardly volatile, and is also in a liquid state within a broad temperature range, so that the impurities are not easily reduced by a purifying method such as distillation or recrystallization. It is therefore necessary for synthesizing a high-purity ionic liquid to use a high-purity raw material. Thus, it is desired in the production method disclosed in Non-Patent Document 1 that the amount of impurities contained in potassium difluorophosphate to be used is as small as possible.

Methods for producing a difluorophosphate such as potassium difluorophosphate are disclosed in, for example, Patent Documents 1 to 8 and Non-Patent Documents 3 to 7 listed below.

Non-Patent Documents 3 and 4 each disclose a method of allowing ammonium fluoride or acidic sodium fluoride to act onto diphosphorous pentaoxide to provide a difluorophosphate. However, in the respective production methods disclosed in these documents, besides the difluorophosphate, a monofluorophosphate, a phosphate, and water are produced as by-products in large amounts. Accordingly, a large burden is imposed on a subsequent purifying step. Thus, it is not easily mentioned that these methods are effective methods.

Non-Patent Document 5 discloses a method of allowing $P_2O_3F_4$ (difluorophosphoric anhydride) to act onto, for example, an oxide or hydroxide such as $Li_2O$ or LiOH to produce a difluorophosphate. However, difluorophosphoric anhydride is very expensive, and high-purity difluorophosphoric anhydride is not easily available. Thus, this production method is disadvantageous for industrial production.

Patent Document 1 discloses a method of mixing potassium hexafluorophosphate with potassium metaphosphate, and melting the mixture to provide potassium difluorophosphate. However, this production method has the following problem: potassium difluorophosphate is contaminated by a crucible used at the time of melting potassium hexafluorophosphate and potassium metaphosphate. For the melting, it is also necessary to realize an environment of a high temperature such as 700° C. From the viewpoints of product purity and productivity, the production method disclosed in Patent Document 1 cannot be said to be a preferable method.

Non-Patent Document 6 discloses a method of melting urea, potassium dihydrogenphosphate, and ammonium fluoride to react these compounds with one another, thereby producing potassium difluorophosphate. In this production method, the reaction temperature can be lowered to about 170° C. In light of a comparison of this condition with reaction conditions in Patent Document 1, this production method makes it possible to realize industrial production. However, there remain the following problems: it is necessary to dispose of a large amount of ammonia gas produced as a by-product, and a large amount of ammonium fluoride also remains. Thus, from the viewpoints of production efficiency and product purity, the production method disclosed in Non-Patent Document 6 is not preferable, either.

Non-Patent Document 7 discloses a method of: reacting an alkali metal chloride with excessive difluorophosphoric acid; heating and drying hydrogen chloride, which is produced as a by-product, and a surplus of difluorophosphoric acid under reduced pressure to be distilled away; and then obtaining a difluorophosphate. However, even when difluorophosphoric acid sufficiently high in purity is used, a monofluorophosphate and a fluoride salt remain as impurities in large amounts in the difluorophosphate obtained by this method. It is therefore also difficult that the production method disclosed in Non-Patent Document 7 provides a high-purity difluorophosphate.

Patent Documents 2 to 4 each disclose a method of reacting lithium hexafluorophosphate with a borate, silicon dioxide and a carbonate in a nonaqueous solvent to provide lithium difluorophosphate. Moreover, Patent Document 5 discloses a method of bringing a carbonate or borate into contact with a gas such as phosphorous pentafluoride to provide lithium difluorophosphate. However, the production methods disclosed in these documents require a process over a long time of, for example, 40 hours to 170 hours for providing a difluorophosphate. Thus, these methods are unsuitable for industrial production.

Patent Document 6 describes a method of reacting an oxoacid or oxyhalide of phosphorous with a hexafluorophosphate, a halide of an alkali metal, and the like in the presence of hydrogen fluoride to provide a difluorophosphate. According to this method, the hexafluorophosphate acts, through the presence thereof, effectively onto contaminated water so that a high-purity difluorophosphate can be obtained. However, the hexafluorophosphate, which is expensive, is used in a relatively large amount, and further according to methods described in Examples therein, an exhaust gas or waste fluid containing a large amount of phosphorous and fluorine is generated to cause the following problem: the separation and recovery of useful substances, and waste disposal are complicated.

Patent Document 7 discloses a method of reacting a halide of an alkali metal or the like with difluorophosphoric acid in the presence of a hexafluorophosphate to produce a difluorophosphate. Patent Document 8 discloses a method of reacting difluorophosphoric acid with a halide or the like of an alkali metal in difluorophosphoric acid, and providing a difluorophosphate in difluorophosphoric acid by a crystallizing operation. In these production methods, it is necessary to use a high-purity difluorophosphoric acid. However, difluorophosphoric acid is high in corrosive property; thus, reduced pressure distillation or the like is required, and further facilities for the production are complicated. There is also caused the following problem: it is difficult to industrially gain difluorophosphoric acid regardless of the purity thereof.

In the meantime, a high-purity difluorophosphate can be used not only as a raw material of an ionic liquid but also as an additive for an electrolytic solution for lithium secondary batteries. In recent years, as a field to which lithium secondary batteries are applied enlarges from that of electronic instruments such as portable phones, personal computers and digital cameras to that of articles mounted on automobiles, a further rise in performances thereof has been advanced, for example, the power density and the energy density are improved, and a loss in the capacity is restrained. Lithium secondary batteries used, particularly, in articles mounted in automobiles may be exposed to a severer environment than ones used in consumer products; accordingly, the batteries are required to have a high reliability in terms of cycle life and storage performance. An electrolytic solution used in lithium secondary batteries is a nonaqueous electrolytic solution in which a lithium salt is dissolved in an organic solvent. The decomposition of such a nonaqueous electrolytic solution, and a side reaction thereof affect the performance of the lithium secondary batteries. Consequently, attempts have been made for improving the batteries in cycle life and storage performance by mixing various additives with the nonaqueous electrolytic solution.

For example, Patent Document 9 discloses that an organic solvent, as a nonaqueous electrolytic solution for lithium secondary batteries, contains at least one of lithium monofluorophosphate and lithium difluorophosphate as an additive. Patent Document 9 states that the use of such a nonaqueous electrolytic solution makes it possible to form a film onto a positive electrode and a negative electrode, respectively, thereby restraining the electrolytic solution from being decomposed by contact between the nonaqueous electrolytic solution, and a positive active material and a negative active material. Thus, the battery can be restrained from undergoing self-discharge and be improved in storage performance.

PRIOR ART DOCUMENTS

Patent Documents

Patent Document 1: German Patent No. 813848
Patent Document 2: JP-A-2005-53727
Patent Document 3: JP-A-2005-219994
Patent Document 4: JP-A-2005-306619
Patent Document 5: JP-A-2006-143572
Patent Document 6: JP-A-2010-155774
Patent Document 7: JP-A-2010-155773
Patent Document 8: JP-A-2012-51752
Patent Document 9: Japanese Patent No. 3439085

Non-Patent Documents

Non-Patent Document 1: K. Matsumoto and R. Hagiwara, Inorganic Chemistry, 2009, 48, 7350-7358
Non-Patent Document 2: The Electrochemical Society of Japan, $77^{th}$ Conference, Proceedings, 1118
Non-Patent Document 3: Ber. Dtsch. Chem., Ges. B26 (1929) 786
Non-Patent Document 4: Zh. Neorgan. Khim., 7 (1962) 1313-1315
Non-Patent Document 5: Journal of Fluorine Chemistry, 38 (1988) 297-302
Non-Patent Document 6: The Japan Society for Analytical Chemistry, $43^{th}$ Annual Convention, Summaries, 536 (1994)
Non-Patent Document 7: Inorganic Nuclear Chemistry Letters, Vol. 5 (1969) 581-585

SUMMARY OF THE INVENTION

Problems to be Solved by the Invention

The present invention has been made in light of the above-mentioned problems, and an object thereof is to provide a method for purifying a difluorophosphate, in which a difluorophosphate is purified to a high purity.

Solutions to the Problems

In order to solve the problems in the prior art, the present inventors have investigated a method for purifying a difluorophosphate. As a result, the present inventors have found out that by adopting the following configuration, the difluorophosphate can be improved in purity. Thus, the present invention has been achieved.

In order to solve the above-mentioned problems, the method for purifying a difluorophosphate, comprising bringing hydrogen fluoride into contact with a difluorophosphate containing an impurity and subsequently heating and drying the difluorophosphate, or bringing the hydrogen fluoride into contact with the difluorophosphate containing the impurity while heating and drying the difluorophosphate containing the impurity, thereby removing the impurity.

According to the above configuration, hydrogen fluoride is brought into contact with a difluorophosphate, thereby making it possible to remove impurities including anionic impurities such as monofluorophosphate ions and phosphate ions, free acids, and insoluble substances that are contained in the difluorophosphate. Thus, the difluorophosphate can be improved in purity.

A mechanism for purifying the difluorophosphate, against the impurities, by hydrogen fluoride is unclear, but would be based on the following phenomenon:

The monofluorophosphate ions and phosphate ions are produced by hydrolysis of difluorophosphate ions. Accordingly, in the process of producing the difluorophosphate, these anionic impurities are unfavorably produced by reaction between water contaminated or produced as a by-product and difluorophosphate ions.

In the meantime, it is presumed that the free acids originate from fluorophosphoric acids such as difluorophosphoric acid and monofluorophosphoric acid, phosphoric acid, or salts such as hydrogenmonofluorophosphate and hydrogenphosphate, depending on the method for producing a difluorophosphate. Fluorophosphoric acid can be distilled away by sufficiently heating and drying the fluorophosphoric acid under the atmospheric pressure or reduced pressure. However, it is difficult to remove phosphoric acid, and impurities originating from salts such as hydrogenmonofluorophosphate and hydrogenphosphate even by heating. When hydrogen fluoride acts onto these impurities, for example, phosphoric acid is changed into a fluorophosphoric acid, which has a lower boiling point. Consequently, the acid can be distilled away by heating and drying. Moreover, it is presumed that when hydrogen fluoride acts onto the hydrogenphosphate and the hydrogenmonofluorophosphate, these salts are changed to a difluorophosphate.

Furthermore, in the above configuration, the contact between the difluorophosphate and hydrogen fluoride can be attained by bringing hydrogen fluoride gas, or hydrofluoric acid anhydride in a liquid form into contact with the difluorophosphate. This makes it possible to bring hydrogen fluoride gas into direct contact with the difluorophosphate to remove the impurities in a short time.

Moreover, in the above configuration, the contact between the difluorophosphate and hydrogen fluoride can be attained by bringing a mixed gas of an inert gas and hydrogen fluoride gas into contact with the difluorophosphate. This makes it possible to restrain the generation of a hexafluorophosphate. This also makes it easier to control the concentration, the flow rate, the temperature and the pressure of hydrogen fluoride than the case of performing the direct contact of hydrogen fluoride gas, so that a burden onto facilities can be relieved. Furthermore, this case prevents the time for the contact with the difluorophosphate from being too short, and results in an easy control of the contact time.

In the above configuration, it is preferred that the difluorophosphate containing the impurity is: one in the process of producing the difluorophosphate in the fluorophosphoric acid solution by adding a hexafluorophosphate of at least one selected from the group consisting of an alkali metal, an alkaline earth metal, and an onium to a solution of a fluorophosphoric acid, and subsequently heating the fluorophosphoric acid solution to distill away the fluorophosphoric acid.

In the above configuration, it is preferred that the difluorophosphate containing the impurity is: one in the process of producing the difluorophosphate in the fluorophosphoric acid solution by adding a hexafluorophosphate of at least one selected from the group consisting of an alkali metal, an alkaline earth metal, and an onium to a solution of a fluorophosphoric acid, and further by depositing the difluorophosphate in the fluorophosphoric acid solution by crystallization, and separating the difluorophosphate by solid-liquid separation.

As performed in these configurations, in the present invention, even by bringing hydrogen fluoride gas or a mixed gas containing hydrogen fluoride gas and an inert gas into contact with the difluorophosphate in the process of production, impurities including anionic impurities such as monofluorophosphate ions and phosphate ions, free acids, and insoluble substances can be removed.

Moreover, in the above configuration, it is preferred that the gas hydrogen fluoride gas, or the mixed gas of hydrogen fluoride gas and an inert gas is brought into contact with the difluorophosphate while the gas is allowed to flow into the difluorophosphate, thereby distilling away a by-product produced from reaction between the impurity contained in the difluorophosphate, and hydrogen fluoride gas. By bringing hydrogen fluoride gas, or a mixed gas of hydrogen fluoride gas and an inert gas into contact with the difluorophosphate while the gas allowed to flow thereinto, a by-product generated by the contact can be distilled away without being caused to remain.

Moreover, in the above configuration, it is preferred that when the gas hydrogen fluoride gas, or the mixed gas of hydrogen fluoride gas and an inert gas is brought into contact with the difluorophosphate, the temperature of the difluorophosphate is a temperature at which the gas hydrogen fluoride gas is not condensed. If the temperature of the difluorophosphate is too low in the contact of hydrogen fluoride with the difluorophosphate, hydrogen fluoride may be condensed. In the embodiment, hydrogen fluoride is brought, without being condensed, into contact with the difluorophosphate, whereby impurities can be more effectively removed to restrain the generation of unevenness in the treatment, or the like.

Moreover, in the above configuration, it is preferred that the difluorophosphate is lithium difluorophosphate.

Effects of the Invention

The present invention produces the following effects by the configurations described above:

According to the present invention, the contact of hydrogen fluoride with a difluorophosphate makes it possible to remove impurities contained in the difluorophosphate, including anionic impurities such as monofluorophosphate ions and phosphate ions, free acids, and insoluble substances. Thus, the difluorophosphate can be very simply improved in purity.

EMBODIMENTS OF THE INVENTION

An embodiment of the present invention will be described hereinafter.

A method for purifying a difluorophosphate according to the present embodiment includes at least a step of bringing hydrogen fluoride into contact with a difluorophosphate, and a step of heating and drying the difluorophosphate.

The method for bringing hydrogen fluoride into contact with the difluorophosphate is not particularly limited, and is, for example, a method of bringing hydrogen fluoride gas into contact with the difluorophosphate. In the case of this method, hydrogen fluoride gas can be brought into contact with the difluorophosphate while the temperature and the pressure are controlled. A mixed gas containing hydrogen fluoride gas and an inert gas may be brought into contact with the difluorophosphate. This makes it easy to control the concentration, the flow rate and the pressure of hydrogen fluoride to be brought into contact with the difluorophosphate, to relieve a burden onto facilities. Moreover, this can restrain the production of a hexafluorophosphate. Furthermore, this prevents a time for the contact between the mixed gas and the difluorophosphate from being too short, so that the control of the contact time is also made easy. A different example of the method for bringing hydrogen fluoride into contact with the difluorophosphate is a method for bringing a mixed solution of hydrogen fluoride and an organic solvent into contact with the difluorophosphate. This method makes it possible to appropriately adjust the concentration of hydrogen fluoride while the degree of purification of the difluorophosphate is checked.

The method for bringing hydrogen fluoride into contact with the difluorophosphate may be, besides the above-mentioned methods, a method for bringing into contact hydrofluoric acid anhydride in a liquid form with the difluorophosphate. In this method, however, the difluorophosphate and hydrogen fluoride react with each other to produce a large amount of a hexafluorophosphate. Thus, it is preferred to appropriately adjust the amount or concentration of hydrogen fluoride when the production of the hexafluorophosphate is unfavorable for the usage thereof. However, this is inapplicable to a case where the difluorophosphate is supplied to a usage in which the production of the hexafluorophosphate causes no problem.

The method for bringing hydrogen fluoride gas or the mixed gas containing hydrogen fluoride gas and an inert gas (hereinafter referred to as "hydrogen fluoride gas or the like") into contact with the difluorophosphate is not particularly limited. Examples thereof include a method of allowing hydrogen fluoride gas or the like to flow into the difluorophosphate, and a method of sealing hydrogen fluoride gas or the like into an airtightly closed vessel in which the difluorophosphate is received. The method for purifying a difluorophosphate according to the present embodiment is based on the technique of reacting hydrogen fluoride with impurities contained in the difluorophosphate. Thus, in order that a by-product produced by the reaction can be distilled away without being caused to remain, it is preferred to allow hydrogen fluoride gas or the like to flow into the difluorophosphate. However, from the viewpoint of the treatment of exhaust gas and a burden onto facilities for recovering hydrogen fluoride, the method of the sealing into the airtightly closed vessel is more preferred. Even when any of these methods is adopted, an excellent difluorophosphate-purifying effect is achieved. Thus, from the viewpoints of the scale of facilities and economical efficiency, any method may be appropriately selected and performed.

The time for the contact between hydrogen fluoride gas or the like and the difluorophosphate needs to be appropriately adjusted in accordance with the amount of the impurities in the difluorophosphate, and the concentration of hydrogen fluoride in the inert gas allowed to flow thereinto. In this case, the contact time can be made shorter by bringing hydrogen fluoride gas alone into direct contact with the difluorophosphate. When hydrogen fluoride gas or the like is allowed to flow into the difluorophosphate, the flow rate of hydrogen fluoride gas or the like is varied in accordance with the amount of the difluorophosphate to be purified, the amount of the impurities contained therein, the shape of a container in which the flowing-into is attained, and the like. Thus, it is preferred to appropriately adjust the flow rate while the degree of purification is checked. Also when hydrogen fluoride gas or the like is sealed into the airtightly closed vessel to conduct the purifying treatment, the flow rate may be appropriately adjusted in accordance with the amount of the impurities in the difluorophosphate, the contact time, and the concentration of hydrogen fluoride gas in the inert gas.

When hydrogen fluoride gas or the like is brought into contact with the difluorophosphate, the temperature of the difluorophosphate is preferably a temperature at which the hydrogen fluoride gas is not condensed at any rate. More specifically, the temperature ranges preferably from 20° C. to 200° C., more preferably from 25° C. to 180° C., even more preferably 25° C. to 150° C., in particular preferably from 25° C. to 130° C. Since hydrogen fluoride has a boiling point of 20° C., hydrogen fluoride is condensed by setting the temperature of the difluorophosphate to 20° C. or higher. Consequently, it is possible to prevent a decline in the removal efficiency of the impurities, and the generation of unevenness in the treatment, and the like. On the other hand, by setting the temperature of the difluorophosphate to 200° C. or lower, a problem about the durability of the drying machine can be avoided.

The reaction between the impurities in the difluorophosphate and hydrogen fluoride occurs at the interface between a solid phase of particles of the difluorophosphate and a gas phase containing hydrogen fluoride gas. Accordingly, in order to increase the area of the interface between the solid phase and the gas phase, it is also effective to pulverize the difluorophosphate before the purifying method of the present invention is performed.

In the contact between hydrogen fluoride and the difluorophosphate, the difluorophosphate itself also essentially reacts gradually with hydrogen fluoride to produce a hexafluorophosphate. In the case of bringing only hydrogen fluoride gas into direct contact therewith, a hexafluorophosphate is easily produced. Thus, when the contamination of the hexafluorophosphate is improper, it is preferred to use the mixed gas containing hydrogen fluoride gas and an inert gas. This makes it possible to easily control the production of the hexafluorophosphate. This is inapplicable to any case where the production of the hexafluorophosphate causes no problem. When the mixed gas is brought into contact therewith, the hexafluorophosphate content in the difluorophosphate does not largely increase. The reason therefor is unclear, but is considered that the reactivity between the difluorophosphate and hydrogen fluoride is relatively lower than that between the impurities contained in the difluorophosphate and hydrogen fluoride. On the other hand, it is also possible to positively produce the hexafluorophosphate to produce a mixture of the difluorophosphate and the hexafluorophosphate.

The inert gas is not particularly limited. Examples thereof include rare gases such as helium, neon, argon, krypton, xenon and radon, and nitrogen. Of these inert gases, nitrogen is preferred from the viewpoint of economical efficiency.

The concentration of hydrogen fluoride gas in the mixed gas preferably ranges from 5 to 95%, more preferably from 10 to 90%, even more preferably from 20 to 80%, in particular preferably from 30 to 70% by volume of the total of the mixed gas. When the concentration of hydrogen fluoride is set to 5% or more by volume, the contact time for decreasing the impurities is longer, so that the purifying efficiency of the difluorophosphate can be prevented from being lowered. On the other hand, when the concentration is set to 95% or less by volume, the production of the hexafluorophosphate is restrained, and further the contact time can be prevented from being short to be made difficult in controllability.

In the above-mentioned method of bringing a mixed solution of hydrogen fluoride and an organic solvent into contact with the difluorophosphate, the concentration of hydrogen fluoride can be appropriately adjusted while the degree of purification is checked. The organic solvent used therein is not particularly limited, and is preferably an organic solvent which substantially has no reactivity with hydrogen fluoride and any difluorophosphate, and which does not undergo denaturation based on decomposition. Furthermore, the solvent is preferably a solvent that is easily distilled away after the contact thereof with the difluorophosphate. From such viewpoints, examples thereof include cyclic carbonates, linear carbonates, phosphates, cyclic ethers, linear ethers, lactone compounds, linear esters, nitrile compounds, amide compounds, sulfone compounds, and alcohols.

The cyclic carbonates are not particularly limited, and examples thereof include ethylene carbonate, propylene carbonate, and butylene carbonates. Of these cyclic carbonates, preferred are ethylene carbonate and propylene carbonate. The linear carbonates are not particularly limited, and examples thereof include dimethyl carbonate, ethylmethyl carbonate, and diethyl carbonate. Of these linear carbonates, preferred are dimethyl carbonate and ethylmethyl carbonate. The phosphates are not particularly limited, and examples thereof include trimethyl phosphate, triethyl phosphate, ethyldimethyl phosphate, and diethylmethyl phosphate. The cyclic ethers are not particularly limited, and examples thereof include tetrahydrofuran and 2-methyltetrahydrofuran. The linear ethers are not particularly limited, and examples thereof include dimethoxyethane. The lactone compounds are not particularly limited, and examples thereof include γ-butyrolactone. The linear esters are not particularly limited, and examples thereof include methyl propionate, methyl acetate, ethyl acetate, and methyl formate. The nitrile compounds are not particularly limited, and examples thereof include acetonitrile. The amide compounds are not particularly limited, and examples thereof include dimethylformamide. The sulfone compounds are not particularly limited, and examples thereof include sulfolane and methylsulfolane. The alcohols are not particularly limited, and examples thereof include methyl alcohol, ethyl alcohol, n-propyl alcohol, iso-propyl alcohol, butyl alcohol, and octyl alcohol. These organic solvents may be used alone or in the form of a mixture of two or more thereof. A solvent can be preferably used in which hydrogen atoms in a hydrocarbon group contained in the molecule of any of these organic solvents are at least partially substituted with one or more fluorine atoms.

The concentration of hydrogen fluoride in the organic solvent preferably ranges from 0.1 to 95%, more preferably from 0.25 to 90%, even more preferably from 0.5 to 80%, in particular preferably from 1 to 70% by mass of the whole. When the concentration of hydrogen fluoride is set to 0.1% or more by mass, the contact time for decreasing the impurities is longer, so that the purifying efficiency of the difluorophosphate can be prevented from being lowered. On the other hand, when the concentration is set to 95% or less by volume, the production of the hexafluorophosphate is restrained, and further the contact time can be prevented from being short to be made difficult in controllability. However, this preferred range is inapplicable to any case where the contact time can be made long even when the concentration is less than 0.1% by mass. In the case, the concentration can be appropriately set in accordance with the scale of facilities or the process time.

In the present embodiment, after hydrogen fluoride gas or the like is brought into contact with the difluorophosphate, the step of heating and drying the difluorophosphate is performed. The heating and drying may be performed under normal pressure or under reduced pressure. The heating and drying temperature preferably ranges from 20° C. to 200° C., more preferably from 40° C. to 180° C., even more preferably from 60° C. to 150° C., in particular preferably from 70° C. to 130° C. When the heating temperature is set to 20° C. or higher, a by-product generated by the reaction between the impurities and hydrogen fluoride can be sufficiently distilled away. On the other hand, when the heating temperature is set to 200° C. or lower, a problem about the durability of the drying machine can be avoided. The heating time may be appropriately set as required in accordance with the heating temperature and other conditions. Specifically, the heating time preferably ranges from 2 hours to 12 hours, more preferably from 3 hours to 11 hours, in particular preferably from 4 hours to 10 hours.

In the case of adopting, as a different example of the method for bringing hydrogen fluoride into contact with the difluorophosphate, the method for bringing a mixed solution of hydrogen fluoride and an organic solvent into contact with the difluorophosphate, the heating and drying temperature preferably ranges from 20° C. to 200° C., more preferably from 40° C. to 180° C., even more preferably from 60° C. to 150° C. When the heating temperature is set to 20° C. or higher, the fluorophosphoric acid can be prevented from being insufficiently distilled away. On the other hand, when the heating temperature is set to 200° C. or lower, a problem about the durability of the drying machine can be avoided. The heating time is appropriately set as required in accordance with the heating temperature and other conditions. Specifically, the heating time preferably ranges from 2 hours to 35 hours, more preferably from 3 hours to 30 hours, in particular preferably from 4 hours to 25 hours. From the viewpoint of the drying machine used for the heating and drying, the drying is preferably performed under normal pressure. In order to promote distillation-off of volatile substances (fluorophosphoric acid and the organic solvent), the drying may be performed under reduced pressure. From the viewpoint of drying efficiency, a mechanical operation such as vibrating, swinging or stirring may be performed in the drying.

The difluorophosphate to be subjected to the purifying treatment may be a finished product, or may be a difluorophosphate in the process of production. The production of the difluorophosphate is attained, for example, by performing the step of producing a fluorophosphoric acid, the step of producing a difluorophosphate in a solution of the fluorophosphoric acid, and the step of heating and drying the fluorophosphoric acid containing the difluorophosphate to distill away a surplus of the fluorophosphoric acid or the step of separating a deposit deposited in the fluorophosphoric acid by crystallizing operation, from the fluorophosphoric acid, by solid-liquid separation, and further distilling away the fluorophosphoric acid contained in the deposit. Thus, the purification of a difluorophosphate according to the present embodiment may be applied to, for example, the difluorophosphate in the process of heating and drying the fluorophosphoric acid containing the difluorophosphate to distill away the fluorophosphoric acid. The purifying method may be applied to the difluorophosphate obtained by precipitating the difluorophosphate in the fluorophosphoric acid solution by crystallization, and then separating the difluorophosphate by solid-liquid separation. Hereinafter, the respective steps will be described in detail.

In the above-mentioned step of producing a fluorophosphoric acid, hydrofluoric acid anhydride is reacted with at least one selected from the group consisting of an oxoacid, an oxoacid anhydride, and an oxyhalide of phosphorous. In this step, hydrofluoric acid anhydride is not used in the form of a mixture with an organic solvent. Thus, a countermeasure against exposure to an organic solvent is unnecessary so that the specification of facilities for the production can be prevented from being complicated. The use of an organic solvent causes the following problem: in the organic solvent after the production of the fluorophosphoric acid, acids such as the fluorophosphoric acid and hydrogen fluoride are produced as by-products, and thus the separation of these useful substances and waste disposal are complicated. However, in the present embodiment, problems about the separation and recovery of such useful substances, waste disposal, and the like can also be removed.

The oxoacid of phosphorous is not particularly limited, and examples thereof include phosphoric acid, metaphosphoric acid, pyrophosphoric acid, which is obtained by dehydration-condensing phosphoric acid, chain polyphosphoric acids such as tripolyphosphoric acid, cyclic polyphosphoric acids such as trimetaphosphoric acid, phosphonic acid, and phosphinic acid. These may be used alone or in any combination of two or more thereof.

The oxoacid anhydride of phosphorous is not particularly limited, and examples thereof include respective anhydrides of the above-mentioned oxoacid of phosphorous. A more specific example thereof is diphosphorous pentoxide. The oxoacid anhydride of phosphorous that is exemplified herein may be used alone or in any combination of two or more thereof.

The oxyhalide of phosphorous is not particularly limited, and examples thereof include phosphoric trichloride, phosphoric trifluoride, phosphoric dichloride fluoride, and diphosphoryl chloride. These may be used alone or in any combination of two or more thereof.

The fluorophosphoric acid produced in the present embodiment has a composition containing phosphorous (P), oxygen (O), hydrogen (H), and fluorine (F). When the mole number of phosphorous is regarded as 1 and the respective ratios by mole of oxygen, hydrogen, and fluorine to phosphorous are represented by a, b and c, respectively, the ratio of "the mole number of P":"that of O":"that of H":"that of F" is represented by 1:a:b:c. The respective ranges of a, b and c are preferably $1 \leq a \leq 10$, $0.8 \leq b \leq 10$, and $0.8 \leq c \leq 10$; more preferably $2 \leq a \leq 5$, $0.9 \leq b \leq 5$, and $0.9 \leq c \leq 5$; and even more preferably $2.5 \leq a \leq 3$, $1 \leq b \leq 3$, and $1 \leq c \leq 3$. The respective lower limits of the mole numbers of hydrogen and fluorine to that of phosphorous can be adjusted in accordance with the quantity of hydrofluoric acid anhydride. When the above-mentioned values of b and c are each set to 0.8 or more, the resultant fluorophosphoric acid can be prevented from being too high in viscosity to cause the problem of the operability thereof. About the respective mole numbers of oxygen, hydrogen and fluorine to that of phosphorous, the upper limit of each thereof can be adjusted in accordance with the kind or the amount of the oxoacid of phosphorous or the oxoacid anhydride of phosphorous, and the amount of hydrofluoric acid anhydride to be mixed. When the value of each of a, b and c is set to 10 or less, it is possible to prevent the finally obtained difluorophosphate from containing a large proportion of the impurities such as the monofluorophosphate and phosphate to lower the quality of the product. Moreover, the composition of the fluorophosphoric acid can also be adjusted through distillation or the like.

If the ratio of the mole number of hydrogen or fluorine to that of phosphorous is lower within the range of the composition of the fluorophosphoric acid, the fluorophosphoric acid may increase in viscosity. Thus, in a case where the operation is hindered, the oxoacid and the like of phosphorous may be added batch-wise when a hexafluorophosphate is added in the subsequent step, as far as the above-mentioned composition range is satisfied. In other words, at the time of synthesizing the fluorophosphoric acid, a smaller amount than a desired amount of the oxoacid and the like of phosphorous is added and then the amount of the oxoacid and the like that is insufficient from the desired amount may be added just before or simultaneously with the time of charging the hexafluorophosphate in the subsequent step.

In the synthesis of the fluorophosphoric acid, the reaction between the oxoacid and the like of phosphorous and hydrofluoric acid anhydride is very intense. It is therefore preferred to mix these components with each other while the system is sufficiently cooled. The range of the cooling temperature is preferably from −40° C. to 10° C., more preferably from −30° C. to 0° C., in particular preferably from −20° C. to −5° C. When the cooling temperature is set to −40° C. or higher, the reaction system is increased in viscosity to prevent the stirring efficiency from being lowered, so that economical efficiency can also be improved. On the other hand, when the cooling temperature is set to 10° C. or lower, the reactivity between the oxoacid and the like of phosphorous and hydrofluoric acid anhydride can be controlled. When the reactivity cannot be controlled, local generation of heat is caused to volatilize components in the vicinity thereof, so that the mass of the resultant fluorophosphoric acid is lowered relatively to that of the raw materials loaded (the total mass of the oxoacid and the like of phosphorous, and hydrofluoric acid anhydride).

When the oxoacid and the like of phosphorous is/are added to hydrofluoric acid anhydride, the above-mentioned cooling temperature means the temperature of the oxoacid and the like of phosphorous. When the oxoacid and the like of phosphorous and hydrofluoric acid anhydride are added to the fluorophosphoric acid, the cooling temperature means the temperature of the fluorophosphoric acid.

About the reactivity between the oxoacid and the like of phosphorous and hydrofluoric acid anhydride at the time of mixing them, the reduction percentage by mass of the fluorophosphoric acid can be used as an index thereof. The reduction percentage by mass of the fluorophosphoric acid is preferably 5% by mass or less, more preferably 2.5% by mass or less, even more preferably 1.5% by mass or less, in particular 1% by mass or less. The reduction percentage (%) by mass of the fluorophosphoric acid can be calculated in accordance with the following: ((mass of raw materials loaded)−(mass of fluorophosphoric acid))/(mass of raw materials loaded)×100.

The cooling time when the fluorophosphoric acid is synthesized is appropriately set as required, considering a relationship thereof with the cooling temperature. The cooling is preferably performed until the addition of the oxoacid and the like of phosphorous to hydrofluoric acid anhydride is finished. More specifically, the time preferably ranges from 2 hours to 10 hours, more preferably from 3 hours to 8 hours, in particular preferably from 3.5 hours to 7.5 hours.

The step of producing a difluorophosphate is performed by reacting a hexafluorophosphate with the fluorophosphoric acid. This reaction is conducted in the fluorophosphoric acid solution. Thus, no organic solvent is used so that the fluorophosphoric acid solution fulfils a function as a reaction solvent. In a conventional method for producing a difluorophosphate, a synthesis example is also known in which no organic solvent is used. For example, a method is performed in which hydrogen fluoride is added to lithium hexafluorophosphate, lithium fluoride and diphosphorous pentoxide to react these components with one another, thereby producing lithium difluorophosphate. However, in such a synthesis, the reaction advances very intensely to cause an inconvenience that the resultant lithium difluorophosphate is unstable in quality. This is considered because the intense reaction causes local generation of heat, or the like, whereby the temperature distribution of the inside of the reaction vessel is uneven, and thus conditions for the reaction are not easily stabilized. However, in the present embodiment, the beforehand synthesized fluorophosphoric acid is used as a reaction solvent to react this fluorophosphoric acid and the hexafluorophosphate with each other, so that the generation of unevenness is reduced in the temperature distribution of the inside of the reaction vessel. Thus, the reaction conditions can be stabilized. As a result, the resultant difluorophosphate can be made more stable in quality.

The step of producing a difluorophosphate is performed in the absence of respective halides, carbonates, borates, phosphates, hydroxides, or oxides of an alkali metal, an alkaline earth metal, aluminum, or an onium (hereinafter referred to as the halide of an alkali metal or the like). In the present embodiment, no organic solvent is used in the production of the difluorophosphate; therefore, it is possible to prevent the generation of insoluble components resulting from the halides and the like of an alkali metal and the like by no addition of the halide and the like of an alkali metal and the like. Moreover, the raw materials used are reduced so that the method of the present embodiment is improved in productivity, and new impurities (particularly, water) can be prevented from being taken into the system. As a result, a high-quality difluorophosphate can be produced.

Examples of the alkali metal include Li, Na, K, Rb and Cs. Examples of the alkaline earth metal include Be, Mg, Ca, Sr and Ba. Examples of the onium include ammonium, phosphonium, and sulfonium. Examples of the ammonium include NH4+, secondary ammonium, tertiary ammonium, and quaternary ammonium. Examples of the quaternary ammonium include tetraalkylammoniums (such as tetramethylammonium, tetraethylammonium, and triethylmethylammonium), imidazolium, pyrazolium, pyrimidinium, triazolium, pyridazinium, thiazolium, oxazolium, pyrimidinium, and pyrazinium. Examples of the phosphonium include tetraalkylphosphoniums (such as tetramethylphosphonium and tetraethylphosphonium). Examples of the sulfonium include trialkylsulfoniums (such as trimethylsulfonium and triethylsulfonium).

Examples of the halides include fluorides, chlorides, bromides, and iodides. Examples of the borates include orthoborate, metaborate, diborate, tetraborate, pentaborate, and octaborate. Examples of the phosphates include orthophosphate, monohydrogenphosphate, dihydrogenphosphate, metaphosphate, monohydrogenmetaphosphate, dihydrogenmetaphosphate, phosphenate, and metaphosphenate.

The mixing of the hexafluorophosphate with the fluorophosphoric acid solution is preferably performed by adding the hexafluorophosphate to the fluorophosphoric acid solution. The addition of the hexafluorophosphate may be appropriately decided in light of the reaction situation. Thus, a predetermined amount thereof may be added at one time, or may be added in plural portions. When the hexafluorophosphate is added to the fluorophosphoric acid solution, the liquid temperature of the fluorophosphoric acid solution preferably ranges from −40° C. to 100° C., more preferably from −30° C. to 90° C., in particular preferably from −20° C. to 80° C. By setting the liquid temperature to 100° C. or lower, the fluorophosphoric acid solution can be prevented from being decomposed by heat when the hexafluorophosphate contacts the fluorophosphoric acid solution. On the other hand, by setting the liquid temperature to −40° C. or higher, the reaction between the hexafluorophosphate and the fluorophosphoric acid can be promoted.

The conditions for the reaction between the hexafluorophosphate and the fluorophosphoric acid may be set at will. The reaction temperature preferably ranges from 0° C. to 300° C., more preferably from 0° C. to 200° C., in particular preferably from 0° C. to 180° C. The reaction may be conducted under atmospheric pressure or under reduced pressure. The reaction time is usually from 0.5 hours to 5 hours. The time may be appropriately set in accordance with the reactor and the amounts changed.

In order to enhance the efficiency of the reaction between the hexafluorophosphate and the fluorophosphoric acid, reflux may be performed. The temperature of a tower for the reflux preferably ranges from −50° C. to 10° C., more preferably from −40° C. to 8° C., in particular from −30° C. to 5° C. When insoluble substances are produced in the reaction liquid after the reaction, the components can be filtrated off through an ordinary filtrating operation. A filter used in the filtration is preferably a filter made of a polyolefin or a fluororesin since the reaction liquid is high in acidity and contains hydrofluoric acid. From the viewpoint of economical efficiency, the filter made of a fluororesin is particularly preferred.

The hexafluorophosphate is at least one selected from the group consisting of an alkali metal, alkaline earth metal, and onium.

The alkali metal in the hexafluorophosphate is not particularly limited, and examples thereof include Li, Na, K, Rb, and Cs. These may be used alone or in any combination of two or more thereof. Of these alkali metals, Li, Na and K are preferred from the viewpoints of costs and availability.

The alkaline earth metal is not particularly limited, and examples thereof include Be, Mg, Ca, Sr, Ba and Al. These may be used alone or in any combination of two or more thereof. Of these alkaline earth metals, Mg, Ca, Ba, and Al are preferred from the viewpoints of costs and safety.

The onium is not particularly limited, and examples thereof include ammonium, phosphonium, and sulfonium. These may be used alone or in any combination of two or more thereof.

The mixing ratio of the hexafluorophosphate to the fluorophosphoric acid solution may be set in accordance with the step of distilling away the fluorophosphoric acid, which is performed after the present step. Specifically, the mixing ratio is varied in accordance with whether the step performed after the step of producing the difluorophosphate is the step of distilling a surplus of the fluorophosphoric acid while the fluorophosphoric acid solution is heated and dried, or the step of depositing the difluorophosphate in the fluorophosphoric acid solution by crystallization, and subsequently separating the difluorophosphate by solid-liquid separation to distill away the fluorophosphoric acid.

When the next step is the step of distilling a surplus of the fluorophosphoric acid while the fluorophosphoric acid solution is heated and dried, the ratio of the mole number of hexafluorophosphate ions in the hexafluorophosphate to that of phosphorous in the fluorophosphoric acid, represented by x, preferably satisfies $0.3 \leq x \leq 0.7$, more preferably $0.35 \leq x \leq 0.65$, even more preferably $0.4 \leq x \leq 0.6$. When the value x is set to 0.3 or more, the amount of the fluorophosphoric acid to be distilled away can be prevented from being increased relatively to the amount of the resultant difluorophosphate so that the productivity is lowered. On the other hand, when the value x is set to 0.7 or less, the remaining unreacted hexafluorophosphate, which is as a raw material, can be decreased.

When the next step is the step of performing the solid-liquid separation after the crystallization of the difluorophosphate, a fraction of the difluorophosphate that corresponds to a solubility difference in the fluorophosphoric acid depending on the temperature is recovered. The hexafluorophosphate may be reacted with the fluorophosphoric acid in a molar amount corresponding to the saturated solubility of the difluorophosphate in the fluorophosphoric acid. Thus, the value x preferably satisfies $0.05 \leq x \leq 0.5$, more preferably $0.1 \leq x \leq 0.45$, in particular preferably $0.15 \leq x \leq 0.4$.

When a large amount of the hexafluorophosphate, which is a raw material, is added, a surplus of the hexafluorophosphate remains with being unreacted so that a mixture of the difluorophosphate and the hexafluorophosphate is obtained. In a case where the hexafluorophosphate is, for example, lithium difluorophosphate, the resultant product is a mixture of lithium hexafluorophosphate and lithium difluorophosphate when the amount of lithium hexafluorophosphate loaded is large.

After the step of producing the difluorophosphate, the step of distilling away the remaining fluorophosphoric acid is performed. The purifying the difluorophosphate according to the present embodiment is performed in the present step. The method for distilling away the fluorophosphoric acid is either a method of heating and drying the fluorophosphoric acid including the difluorophosphate to distill away a surplus of the fluorophosphoric acid, or a method of depositing a deposit in the fluorophosphoric acid solution by crystallization, separating the deposit from the fluorophosphoric acid by solid-liquid separation, and distilling away the fluorophosphoric acid contained in the deposit.

In the former method, the heating and drying are performed under an atmosphere of hydrogen fluoride gas, or the mixed gas containing hydrogen fluoride gas and the inert gas. Alternatively, the heating and drying are performed in a gas flow of such a gas. This makes it possible to remove the anionic impurities, the free acids, and the insoluble substances, and further prevent water in the atmosphere from being dissolved in the fluorophosphoric acid solution to hydrolyze the difluorophosphate ions so that impurities, such as monofluorophosphate ions or phosphate ions, are generated to cause a change in the composition. From the viewpoint of the drying machine used, the heating and drying are performed under normal pressure. However, in order to promote the distillation-off of a volatile substance (fluorophosphoric acid), the drying may be performed under reduced pressure. From the viewpoint of drying efficiency, in the drying, a mixing operation may be made, an example thereof being the vibrating, swinging or stirring of the fluorophosphoric acid containing the difluorophosphate. The concentration and the flow rate of hydrogen fluoride gas, or hydrogen fluoride gas in the mixed gas, and other contacting conditions are as described above.

The heating temperature preferably ranges from 20° C. to 200° C., more preferably from 40° C. to 180° C., in particular preferably from 60° C. to 150° C. When the heating temperature is set to 20° C. or higher, the fluorophosphoric acid can be prevented from being insufficiently distilled away and further hydrogen fluoride can also be prevented from being condensed. On the other hand, when the heating temperature is set to 200° C. or lower, a problem about the durability of the drying machine can be avoided. The heating time is appropriately set as required in accordance with the heating temperature and other conditions. Specifically, the time preferably ranges from 2 hours to 35 hours, more preferably from 3 hours to 30 hours, in particular preferably from 4 hours to 25 hours.

In the latter method, the difluorophosphate in the fluorophosphoric acid is first crystallized. The crystallization is performed by heating or cooling the fluorophosphoric acid to make the difluorophosphate into a saturated state or a super saturated state. In this way, a crystal of the difluorophosphate is deposited in the fluorophosphoric acid. The crystallizing temperature may be appropriately set as required. Specifically, the temperature preferably ranges from −100° C. to 100° C., more preferably for −80° C. to 80° C., in particular preferably from −50° C. to 50° C.

After the crystal of the difluorophosphate is deposited, the resultant is subjected to solid-liquid separation. The solid-liquid separation is performed by, for example, filtration. The deposit thus obtained contains the fluorophosphoric acid used as a solvent for the crystallization, and impurities. It is therefore necessary to remove the fluorophosphoric acid by heating and drying. In the present embodiment, impurities produced as by-products by the heating and drying can also be removed from the deposit. At this time, the heating and drying temperature preferably ranges from 20° C. to 200° C., more preferably from 40° C. to 180° C., in particular preferably from 60° C. to 150° C. When the heating temperature is set to 20° C. or higher, the fluorophosphoric acid can be prevented from being insufficiently distilled away. On the other hand, when the heating temperature is set to 200° C. or lower, a problem about the durability of the drying machine can be avoided. The heating time is appropriately set as required in accordance with the heating temperature and other conditions. Specifically, the time preferably ranges from 2 hours to 35 hours, more preferably from 3 hours to 30 hours, in particular preferably from 4 hours to 25 hours.

The heating and drying are performed under an atmosphere of hydrogen fluoride gas, or the mixed gas containing hydrogen fluoride gas and the inert gas. Alternatively, the heating and drying are performed in a gas flow of such a gas. This makes it possible to remove the anionic impurities, the free acids, and the insoluble substances, and further prevent the fluorophosphoric acid can be removed. From the viewpoint of the drying machine used, the heating and drying are preferably performed under normal pressure. However, in order to promote the distillation-off of a volatile substance (fluorophosphoric acid), the drying may be performed under reduced pressure. From the viewpoint of drying efficiency, in the drying, a mixing operation may be made, an example thereof being the vibrating, swinging or stirring of the fluorophosphoric acid containing the difluorophosphate. This makes it possible to distill away the fluorophosphoric acid and the impurities in the deposit, providing a high-purity difluorophosphate. The concentration and the flow rate of hydrogen fluoride in the inert gas, and other contacting conditions are as described above.

The fluorophosphoric acid solution obtained by the solid-liquid separation dissolves a non-deposited fraction of the difluorophosphate. For this reason, the fluorophosphoric acid solution after the solid-liquid separation can be reused. In the fluorophosphoric acid solution after the solid-liquid separation, the concentration of the difluorophosphate in the fluorophosphoric acid solution is lowered; thus, the reuse of this fluorophosphoric acid solution can be attained by adding thereto a raw-material salt (hexafluorophosphate) corresponding to the amount lowered, or a raw-material salt and a fluorophosphoric acid. In this way, the fluorophosphoric acid and the hexafluorophosphate are reacted with each other; and then in the same manner as described above, a step is repeated in which the fluorophosphoric acid solution containing the difluorophosphate is heated and dried to distill away a surplus of the fluorophosphoric acid. Alternatively, a step is repeated in which by crystallization, the difluorophosphate is deposited in the fluorophosphoric acid solution and then this salt is separated by solid-liquid separation, and subsequently the salt is heated and dried to distill away the fluorophosphoric acid. This makes it possible to efficiently produce a high-purity difluorophosphate.

(Others)

The present embodiment has been described about an embodiment of reacting hydrofluoric acid anhydride containing no organic solvent with the oxoacid and the like of phosphorus to produce a solution of a fluorophosphoric acid, and subsequently using the fluorophosphoric acid solution as a reaction solvent to produce a hexafluorophosphate in the absence of respective halides, carbonates, borates, phosphates, hydroxides, or oxides of an alkali metal, an alkaline earth metal, aluminum, or an onium.

However, the present invention is not limited to this embodiment. The present invention can be applied to a difluorophosphate obtained by reacting at least one selected from the group consisting of an oxoacid, an oxoacid anhydride, and an oxyhalide of phosphorous with a hexafluorophosphate in the presence of hydrogen fluoride. The present invention can also be applied to a difluorophosphate obtained by reacting at least one selected from the group consisting of an oxoacid, an oxoacid anhydride, and an oxyhalide of phosphorous, a hexafluorophosphate, and at least one from the group of consisting of respective halides, carbonates, borates, phosphates, hydroxides, and oxides of an alkali metal, an alkaline earth metal, aluminum, and an onium, in the presence of hydrogen fluoride.

EXAMPLES

Hereinafter, preferred examples of this invention will be exemplarily described in detail. However, the scope of this invention is not limited only into raw materials, blending amounts and others that are described in the examples, as far as the present specification does not include any restricted description thereabout.

Example 1

<Preparation of Lithium Difluorophosphate>

Into a PFA vessel having an internal volume of 3000 mL was weighed 290 g of diphosphorus pentaoxide, and thereto was then added 340 g of lithium hexafluorophosphate. Subsequently, thereto was added 890 g of a 15% by mass (concentration by mass) hydrogen fluoride solution in dimethyl carbonate. The resultant solution was refluxed at 110° C. for 1 hour while nitrogen was allowed to flow thereinto. Insoluble substances in the reaction liquid were filtrated off, and then the filtrate was heated at 130° C. for 24 hours to distill away a surplus of the solvent and reaction by-products. Thereafter, the resultant was cooled to room temperature to provide 237 g of a crystal of lithium difluorophosphate.

Ion chromatography (ICS-1000, manufactured by Dionex Corp.; column AS-23) was used to subject the resultant crystal of lithium difluorophosphate to anion analysis. A relative area ratio of difluorophosphate ions was used as an index of the purity of lithium difluorophosphate. The purity of the resultant lithium difluorophosphate obtained was 95% according to the relative area.

Moreover, 2 g of the resultant powder of lithium difluorophosphate was dissolved into 200 mL of ice water. BTB was used as an indicator to subject the lithium difluorophosphate solution to neutralization titration with a 0.1 N NaOH solution in water. From the amount of NaOH required for neutralization, the concentration of an acid was calculated on the supposition that the acid, which was contained in the sample, was HF. As a result, the concentration of the produced acid contained in the sample was 4500 ppm.

Next, 4 g of the resultant crystal of lithium difluorophosphate was added to 96 g of dimethoxyethane, and then the solution was stirred for 30 minutes. This solution in dimethoxyethane was filtrated through a membrane filter. After the filtration, the membrane filter was dried at 105° C. for 1 hour, and the mass thereof was measured. A value obtained by subtracting, from this mass, the mass of the membrane filter before the use for the filtration was divided by the mass of the lithium difluorophosphate sample, and the resultant value was multiplied by 100. The resultant value (%) was used as the concentration of insoluble substances. As a result, the concentration of the insoluble substances was 1.4% by mass.

<Purification of Lithium Difluorophosphate>

Into a vessel made of PFA and having an internal volume of 1 L was loaded 100 g of the above-mentioned compound lithium difluorophosphate. This system was held in a thermostat set to a temperature of 130° C. while nitrogen was allowed to flow thereinto at 1 L/min. Thereafter, while the system was held in the thermostat at 130° C., the flowing gas was switched from only nitrogen to a nitrogen gas containing 40% by volume of HF. The flow rate thereof was set to 10 L/min. The flowing of the nitrogen gas containing HF was continued for 1 hour. Furthermore, the flowing gas was again switched to nitrogen gas having a flow rate of 1 L/min. The flowing of nitrogen gas was continued for 10 hours while the temperature thereof was kept at 130° C. Thereafter, the system was cooled to room temperature. This provided 98 g of a white crystal of lithium difluorophosphate.

The produced lithium difluorophosphate was again subjected to anion analysis to analyze free acids and insoluble substances therein. As a result, the purity of lithium difluorophosphate was 99% according to the relative area. The concentration of the free acids was 1500 ppm and that of the insoluble substances was 0.6% by mass.

Example 2

<Preparation of Fluorophosphoric Acid>

Into a PFA bottle having an internal volume of 1 L was fractionated 100 g of HF. While the liquid HF was stirred, the system was cooled to −10° C. Thereto was slowly added 284 g of $P_2O_5$ in small portions. The cooling was continued for 1 hour until the addition of $P_2O_5$ was terminated. Furthermore, in order to completely dissolve $P_2O_5$ added, the resultant mixed solution was heated at 80° C. for 5 hours while stirred under a nitrogen atmosphere. This provided 380 g of a fluorophosphoric acid solution.

<Synthesis of Lithium Difluorophosphate>

Into a PFA vessel having an internal volume of 1 L was weighed 136 g of the fluorophosphoric acid solution. Thereto was added 106 g of lithium hexafluorophosphate under a nitrogen atmosphere. At the time of the addition of lithium hexafluorophosphate, the liquid temperature of the fluorophosphoric acid solution was set to 30° C. Thereafter, this system was held in a thermostat set to a temperature of 130° C. for 2 hours while nitrogen was allowed to flow thereinto at 1 L/min. Subsequently, while the system was held in the thermostat at 130° C., the flowing gas was switched from only nitrogen to a nitrogen gas containing 40% by volume of HF. The flow rate thereof was set to 10 L/min. The flowing of the nitrogen gas containing HF was continued for 1 hour. Furthermore, the flowing gas was again switched to nitrogen gas having a flow rate of 1 L/min. The flowing of nitrogen gas was continued for 10 hours while the temperature thereof was kept at 130° C. Thereafter, the system was cooled to room temperature. This provided 72 g of a white crystal of lithium difluorophosphate.

In the same way as in Example 1, the produced lithium difluorophosphate was subjected to anion analysis to analyze free acids and insoluble substances therein. As a result, the purity of lithium difluorophosphate was 99% according to the relative area. The concentration of the free acids was 1200 ppm and that of the insoluble substances was 0.5% by mass.

Comparative Example 1

<Preparation of Fluorophosphoric Acid>
In the same way as in Example 2, 380 g of a fluorophosphoric acid solution was obtained.
<Synthesis of Lithium Difluorophosphate>
Into a PFA vessel having an internal volume of 1 L was weighed 136 g of the fluorophosphoric acid solution. Thereto was added 106 g of lithium hexafluorophosphate under a nitrogen atmosphere. At the time of the addition of lithium hexafluorophosphate, the liquid temperature of the fluorophosphoric acid solution was set to 30° C. Thereafter, this solution was heated and dried to be concentrated to dryness at 130° C. for 20 hours while nitrogen was allowed to flow thereinto. This provided 74 g of a white crystal of lithium difluorophosphate.

In the same way as in Example 1, the produced lithium difluorophosphate was subjected to anion analysis to analyze free acids and insoluble substances therein. As a result, the purity of lithium difluorophosphate was 98% according to the relative area. The concentration of the free acids was 3200 ppm and that of the insoluble substances was 1.3% by mass.

Example 3

<Preparation of Fluorophosphoric Acid>
In the same way as in Example 1, 380 g of a fluorophosphoric acid solution was obtained.
<Synthesis of Lithium Difluorophosphate>
Into a PFA vessel having an internal volume of 1 L was weighed 130 g of the fluorophosphoric acid solution. Thereto was added 52 g of lithium hexafluorophosphate under a nitrogen atmosphere. At the time of the addition of lithium hexafluorophosphate, the liquid temperature of the fluorophosphoric acid solution was set to 50° C. After the addition of lithium hexafluorophosphate, the fluorophosphoric acid solution was further cooled to −20° C. to be subjected to crystallization. In this way, a slurry solution including the fluorophosphoric acid solution and a deposit was obtained.

Subsequently, 165 g of the resultant slurry solution was subjected to solid-liquid separation through filtration under a nitrogen atmosphere. In this way, a white crystal containing the reaction mother liquid was obtained. The white crystal containing the reaction mother liquid was further transferred to a PFA bottle. This system was held in a thermostat set to a temperature of 130° C. for 2 hours while nitrogen was allowed to flow thereinto at 1 L/min. Subsequently, while the system was held in the thermostat at 130° C., the flowing gas was switched from nitrogen to a nitrogen gas containing 40% by volume of HF. The flow rate thereof was set to 10 L/min. The flowing of the nitrogen gas containing HF was continued for 1 hour. Furthermore, the flowing gas was again switched to nitrogen gas having a flow rate of 1 L/min. The flowing of nitrogen gas was continued for 10 hours while the temperature thereof was kept at 130° C. Thereafter, the system was cooled to room temperature. This provided 9 g of a white crystal of lithium difluorophosphate.

In the same way as in Example 1, the produced lithium difluorophosphate was subjected to anion analysis to analyze free acids and insoluble substances therein. As a result, the purity of lithium difluorophosphate was 99% according to the relative area. The concentration of the free acids was 1300 ppm and that of the insoluble substances was 0.7% by mass.

Comparative Example 2

<Preparation of Fluorophosphoric Acid>
In the same way as in Example 3, 380 g of a fluorophosphoric acid solution was obtained.
<Synthesis of Lithium Difluorophosphate>
Into a PFA vessel having an internal volume of 1 L was weighed 130 g of the fluorophosphoric acid solution. Thereto was added 52 g of lithium hexafluorophosphate under a nitrogen atmosphere. At the time of the addition of lithium hexafluorophosphate, the liquid temperature of the fluorophosphoric acid solution was set to 50° C. After the addition of lithium hexafluorophosphate, the fluorophosphoric acid solution was further cooled to −20° C. to be subjected to crystallization. In this way, a slurry solution including the fluorophosphoric acid solution and a deposit was obtained.

Subsequently, 161 g of the resultant slurry solution was subjected to solid-liquid separation through filtration under a nitrogen atmosphere. In this way, a white crystal containing the reaction mother liquid was yielded. The white crystal containing the reaction mother liquid was further transferred to a PFA bottle, and then heated and dried at 130° C. for 20 hours under a nitrogen gas flow. In this way, 10 g of a white crystal was obtained.

In the same way as in Example 3, the produced lithium difluorophosphate was subjected to anion analysis to analyze free acids and insoluble substances therein. As a result, the purity of lithium difluorophosphate was 98% according to the relative area. The concentration of the free acids was 3700 ppm and that of the insoluble substances was 1.2% by mass.

What is claimed is:
1. A method for purifying a difluorophosphate, comprising:
providing a difluorophosphate containing an impurity in a vessel;
flowing hydrogen fluoride into the vessel to bring the hydrogen fluoride into contact with the difluorophosphate; and
heating and drying the difluorophosphate containing the impurity, wherein the heating and drying is performed subsequent to or simultaneous with the flowing of hydrogen fluoride, thereby removing the impurity,
wherein the impurity comprises a free acid, and further comprises an anionic impurity or an insoluble substance,
whereby a compound having a lower boiling point than the free acid is generated as result of the contact between the hydrogen fluoride and the free acid.
2. The method for purifying a difluorophosphate according to claim 1, wherein the contact between the difluoro- phosphate and hydrogen fluoride is attained by flowing hydrogen fluoride gas, or hydrofluoric acid anhydride in a liquid form into the vessel to bring the hydrogen fluoride into contact with the difluorophosphate.

3. The method for purifying a difluorophosphate according to claim 1, wherein the contact between the difluorophosphate and hydrogen fluoride is attained by flowing a mixed gas of an inert gas and hydrogen fluoride gas into the vessel to bring the hydrogen fluoride into contact with the difluorophosphate.

4. The method for purifying a difluorophosphate according to claim 1, wherein the difluorophosphate containing the impurity is
produced by adding a hexafluorophosphate of at least one selected from the group consisting of an alkali metal, an alkaline earth metal, and an onium to a solution of a fluorophosphoric acid, and subsequently
heating the fluorophosphoric acid solution to distill away the fluorophosphoric acid.

5. The method for purifying a difluorophosphate according to claim 1, wherein the difluorophosphate containing the impurity is
produced by adding a hexafluorophosphate of at least one selected from the group consisting of an alkali metal, an alkaline earth metal, and an onium to a solution of a fluorophosphoric acid, and further
by depositing the difluorophosphate in the fluorophosphoric acid solution by crystallization, and separating the difluorophosphate by solid-liquid separation.

6. The method for purifying a difluorophosphate according to claim 2, wherein the hydrogen fluoride is hydrogen fluoride gas and is allowed to flow into the difluorophosphate, thereby distilling away the compound having a lower boiling point than the impurity.

7. The method for purifying a difluorophosphate according to claim 6, wherein when the hydrogen fluoride gas, or a mixed gas of hydrogen fluoride gas and an inert gas is brought into contact with the difluorophosphate, the temperature of the difluorophosphate is a temperature at which the hydrogen fluoride gas is not condensed.

8. The method for purifying a difluorophosphate according to claim 1, wherein the difluorophosphate is lithium difluorophosphate.

9. The method for purifying a difluorophosphate according to claim 3, wherein the mixed gas of hydrogen fluoride gas and an inert gas is brought into contact with the difluorophosphate while the mixed gas is allowed to flow into the difluorophosphate, thereby distilling away the compound having a lower boiling point than the impurity.

10. The method for purifying a difluorophosphate according to claim 9, wherein when the mixed gas of hydrogen fluoride gas and an inert gas is brought into contact with the difluorophosphate, the temperature of the difluorophosphate is a temperature at which the hydrogen fluoride gas is not condensed.

11. The method for purifying a difluorophosphate according to claim 2, wherein the difluorophosphate containing the impurity is
produced by adding a hexafluorophosphate of at least one selected from the group consisting of an alkali metal, an alkaline earth metal, and an onium to a solution of a fluorophosphoric acid, and subsequently
heating the fluorophosphoric acid solution to distill away the fluorophosphoric acid.

12. The method for purifying a difluorophosphate according to claim 2, wherein the difluorophosphate containing the impurity is
produced by adding a hexafluorophosphate of at least one selected from the group consisting of an alkali metal, an alkaline earth metal, and an onium to a solution of a fluorophosphoric acid, and further
by depositing the difluorophosphate in the fluorophosphoric acid solution by crystallization, and separating the difluorophosphate by solid-liquid separation.

13. The method for purifying a difluorophosphate according to claim 3, wherein the difluorophosphate containing the impurity is
produced by adding a hexafluorophosphate of at least one selected from the group consisting of an alkali metal, an alkaline earth metal, and an onium to a solution of a fluorophosphoric acid, and subsequently
heating the fluorophosphoric acid solution to distill away the fluorophosphoric acid.

14. The method for purifying a difluorophosphate according to claim 3, wherein the difluorophosphate containing the impurity is
produced by adding a hexafluorophosphate of at least one selected from the group consisting of an alkali metal, an alkaline earth metal, and an onium to a solution of a fluorophosphoric acid, and further
by depositing the difluorophosphate in the fluorophosphoric acid solution by crystallization, and separating the difluorophosphate by solid-liquid separation.

15. The method for purifying a difluorophosphate according to claim 1, wherein the difluorophosphate is purified to a purity of over 95% and less than 100%.

16. The method for purifying a difluorophosphate according to claim 7, wherein when the hydrogen fluoride gas, or the mixed gas of hydrogen fluoride gas and an inert gas is brought into contact with the difluorophosphate, the temperature of the difluorophosphate is in a range from 20° C. to 200° C.

17. The method for purifying a difluorophosphate according to claim 10, wherein when the mixed gas of hydrogen fluoride gas and an inert gas is brought into contact with the difluorophosphate, the temperature of the difluorophosphate is in a range from 20° C. to 200° C.

* * * * *